(12) United States Patent
Lee

(10) Patent No.: US 10,013,736 B1
(45) Date of Patent: Jul. 3, 2018

(54) IMAGE PERSPECTIVE TRANSFORMATION SYSTEM

(71) Applicant: Amazon Technologies, Inc., Seattle, WA (US)

(72) Inventor: Gordon Lee, Cambridge (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/192,069

(22) Filed: Jun. 24, 2016

(51) Int. Cl.
G06K 9/32 (2006.01)
G06T 3/40 (2006.01)
G06T 7/00 (2017.01)
G06T 5/00 (2006.01)

(52) U.S. Cl.
CPC .......... G06T 3/4023 (2013.01); G06T 5/006 (2013.01); G06T 7/004 (2013.01); *G06T 2207/30196* (2013.01); *G06T 2207/30244* (2013.01)

(58) Field of Classification Search
CPC ........ G06T 3/4023; G06T 5/006; G06T 7/00; G06T 7/004; G06T 2207/30196; G06T 2207/30244; G06K 9/52
See application file for complete search history.

(56) References Cited

U.S. PATENT DOCUMENTS

| 7,492,495 | B2* | 2/2009 | Ishihara | G02B 26/085 359/202.1 |
| 8,297,757 | B2* | 10/2012 | Kubota | H04N 9/3185 353/121 |
| 2007/0248260 | A1* | 10/2007 | Pockett | H04N 13/0022 382/154 |

OTHER PUBLICATIONS

Sukthankar et al., "Automatic Keystone Correction for Camera-assisted Presentation Interfaces," Available at: https://www.ri.cmu.edu/pub files/pub2/sukthankar rahul 2000 1/sukthankar rahul 2000 1.pdf, 9 pages, (2000).

* cited by examiner

*Primary Examiner* — Ali Bayat
(74) *Attorney, Agent, or Firm* — K&L Gates LLP

(57) ABSTRACT

Various examples are directed to systems, devices, and methods effective to transform an image perspective to compensate for a foreshortening effect resulting from an image taken at an angle. An image capture device may capture an image of a subject. A pitch angle of the image capture device may be determined. A transformed, stretched image may be generated by performing a linear perspective transformation of the image. At least one compression value for a portion of the transformed, stretched image may be determined based at least in part on the pitch angle. A nonlinearly transformed image may be generated based at least in part on the portion and the at least one compression value.

20 Claims, 9 Drawing Sheets

IMAGE PERSPECTIVE TRANSFORMATION SYSTEM

BACKGROUND

Cameras and other image sensors may be used to capture images and/or videos of a physical environment. Often, individuals take digital photographs of themselves and/or of others to memorialize a moment or to share photographs on social networks and/or over the internet. At times, the camera or other image sensor may be positioned at a downward angle relative to the subject of the photograph when capturing images and/or videos of the subject. For example, individuals often position wide-angled lens cameras at, or above, head level and angle the camera downward to capture images of themselves. Images captured in such a manner may exhibit a "foreshortening" effect, where the subject's head and/or upper torso appear disproportionately large relative to the legs and the lower body generally.

DETAILED DESCRIPTION

Figure 1:
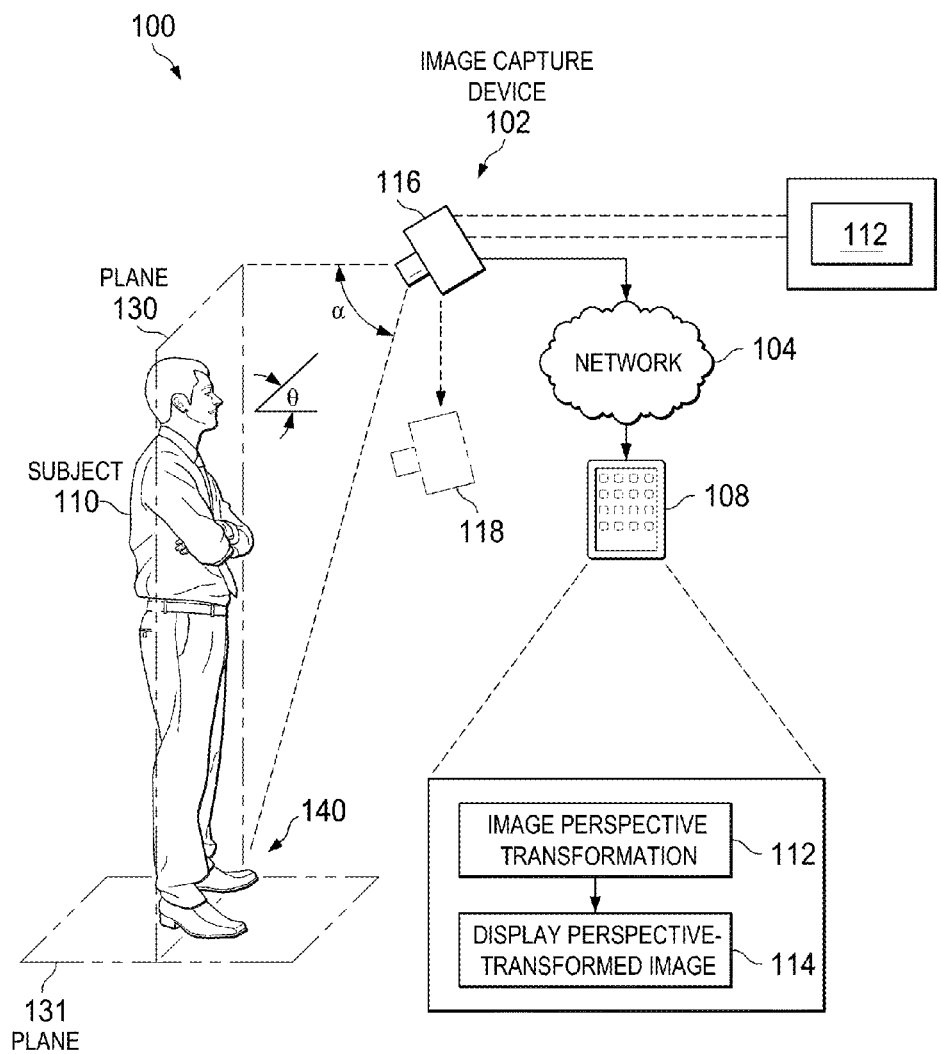
FIG. 1 is a diagram showing an example image perspective transformation system, in accordance with various aspects of the present disclosure.

In the following description, reference is made to the accompanying drawings, that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for image perspective transformation. Images, as described herein, may refer to stand-alone frames of image data or to multiple frames of sequential image data, appended together to form a video. Images may be comprised of data generated by a plurality of pixels arranged in a two-dimensional grid including an x component representing a horizontal direction in the grid and a y component representing a vertical direction in the grid. A pixel may be the smallest addressable unit in an image. A particular pixel may be identified by an x value, representing the horizontal position of the pixel in the two-dimensional grid and a y value, representing the vertical position of the pixel in the two-dimensional grid. A nonlinear perspective transformation may be applied to an image of a subject captured at a downward camera angle relative to the subject of the image. Linear perspective transformation may be applied to the image to reduce a foreshortening effect in which the legs of the subject of the photo in the lower portions of the image appear to be disproportionately compressed relative to the head and torso of the subject in the upper portions of the image. Although the front of a person's body may lie roughly in the same vertical plane, certain parts of the person's body, such as the feet, may protrude significantly from that vertical plane. As a result, a linear perspective transformation to stretch the depiction of the person's legs in the lower portion of the image to have a length proportionate with the person's head and torso in the upper portion of the image may result in the protruding portions of the subject in the image that are not in the same vertical plane as the rest of the subject's body (e.g., the feet of the subject) appearing overly stretched. Nonlinear compression may be applied to the portion of the image that represents features of the subject that are not disposed in the same vertical plane as the rest of the subject's body in order to make all portions of the subject in the resulting image appear to be proportionate. Compression may be increased from the top of the nonlinear portion of the image to the bottom of the nonlinear portion of the image in accordance with techniques described herein, such that the compression applied to a first region of the lower portion of the image roughly corresponding to the subject's legs is less than the compression applied to a second region of the lower portion of the image roughly corresponding to the subject's feet.

FIG. 1 is a diagram showing an example of an environment 100 including an image perspective transformation system. The environment 100 comprises image capture device 102 and display device 108. Image capture device 102 may include, for example, a digital camera module. The digital camera module may comprise any suitable type of image sensor device or devices, such as a charge coupled device (CCD) and/or a complementary metal-oxide semiconductor (CMOS) sensor effective to capture image data from environment 100. Image capture device 102 may include one or more lenses and may be positioned so as to capture images of a portion of environment 100 disposed along an optical axis of image capture device 102. In various examples, lenses of image capture device 102 may be wide-angle lenses effective to capture an angle of view greater than about 55°. For example, image capture device 102 may be effective to capture an angle α of a field of view of environment 100. Image capture device 102 may include, or may be configured to be in communication with, a processing element and/or a memory. The processing element may be effective to execute one or more instructions stored in the memory to perform image perspective transformation on images captured by an image sensor of image capture device 102.

The orientation of the image capture device 102 can cause distortions in the captured image. In the example illustrated in FIG. 1, the camera orientation causes the optical axis of image capture device 102 to be positioned at a pitch angle θ relative to a surface of environment 100 such as a plane 131. In an example, the plane 131 may represent a level, horizontal surface, such as the floor or ground of an area in which image capture device 102 is positioned. In some other examples, plane 131 may be a plane parallel to a substantially horizontal plane of environment 100. In some embodiments it may be necessary to place image capture device 102 at a relatively high position or height within a particular area in order to capture the entirety of an intended subject 110. For example, in a small room, a user who desires to capture a "head-to-toe" image of themselves may need to position image the capture device 102 at a height that is higher than the subject's head and angle the image capture device 102 downward toward the floor of the room in order to avoid cutting off the user's legs and/or feet in the captured image. In another example, a user may position image capture device 102 downward toward the floor of the room in order to capture a more flattering angle of subject 110. In some further examples, the orientation of image capture device 102 may refer to a roll angle of image capture device 102.

Capturing images from a pitch angle θ may cause the portions of the environment 100 depicted in the images to appear disproportionate. For example, in an image captured by image capture device 102 from a downward pitch angle θ, the head and upper torso of a human subject 110 in an upper portion of the image may appear disproportionately large relative to the subject 110's legs and feet in a lower portion of the image because the subject 110's legs and feet are farther from the image capture device 102 than the head and upper torso. To alleviate such distortions, image capture device 102 and/or display device 108 may be effective to perform image perspective transformation 112. Although image capture device 102 may be disposed at position 116 with a first pitch angle θ when capturing an image of subject 110, image perspective transformation 112 may be effective to transform the image of subject 110 to simulate an image captured from an image capture device at a relatively level position 118 with a second pitch angle θ' that is less than the first pitch angle θ.

As will be described in further detail below, perspective transformation 112 may include a linear correction and a nonlinear correction. The linear correction corrects for objects disposed along a principal vertical axis in vertical image plane 130, such as the majority of a standing human's body (e.g., the legs, torso, and/or head of a human subject 110). Vertical image plane 130 may be the focal plane of image capture device 102. Nonlinear correction corrects for distortions in objects that are not disposed along a principal axis of a subject. For example, nonlinear correction may correct for distortion in objects that are not in the vertical image plane 130, such as, for example, the feet 140 of subject 110 in plane 131. In some examples, nonlinear correction may correct for distortion in portions of the subject that are closer to image capture device 102 than the portions of the subject in the focal plane and/or portions of the subject disposed along the principal axis of the subject (e.g., the subject's feet when the subject is facing image capture device 102). The principal axis of a subject may be the longest axis present between boundaries of the subject. For example, if the subject is a standing human, the principal axis may be between the top of the person's head to the bottom of the person's feet. Image perspective transformation, including linear and nonlinear correction, is described in further detail below.

After image perspective transformation 112, display device 108 may display the perspective-transformed image at action 114. Display device 108 may include a display screen, at least one processor, a non-transitory computer-readable memory, and/or a user interface. In some examples, display device 108 may be a mobile computing device such as a smartphone, a handheld or wearable computing device, a tablet computer, or a laptop. In some other examples, display device 108 may be a smart television, a desktop computing device, a video game console, or other computer hardware effective to display a perspective-transformed image at action 114. In various examples, display device 108 may receive image data captured by image capture device 102 and may perform image perspective transformation 112 of the image data. In some other examples, image capture device 102 may perform image perspective transformation 112 and may send the transformed image to display device 108 for display and/or further processing. In some other examples, image capture device 102 may send image data captured by image capture device 102 over a network to a remote computing device (not shown) for image perspective transformation. After performing one or more of the image perspective transformation techniques described herein, the remote computing device may send the transformed image to image capture device 102 and/or directly to display device 108. In various examples, image capture device 102 and display device 108 may be configured to be in communication over a network 104. Network 104 may be, for example, the Internet, a local area network (LAN), a wide area network (WAN), an intranet, an extranet, a point-to-point connection, or the like. Image data, whether transformed at action 112, or not transformed, may be sent between image capture device 102 and display device 108 via network 104. Display device 108 may execute a companion application that may be effective to control image capture device 102. Such a companion application may control image capture device 102 to capture images and/or to generate various display images. In some examples, the companion application may control or provide options to control various parameters of image capture device 102 such as, for example, focus, pan, zoom, roll, pitch, brightness, color, selection of still images or video, video frame rate, augmented reality effects or "skins" to be applied to images captured by image capture device 102, etc. In some examples, a user of the companion application, such as subject 110, may control image capture device 102, including various parameters of image capture device 102 using the companion application.

Figure 2:
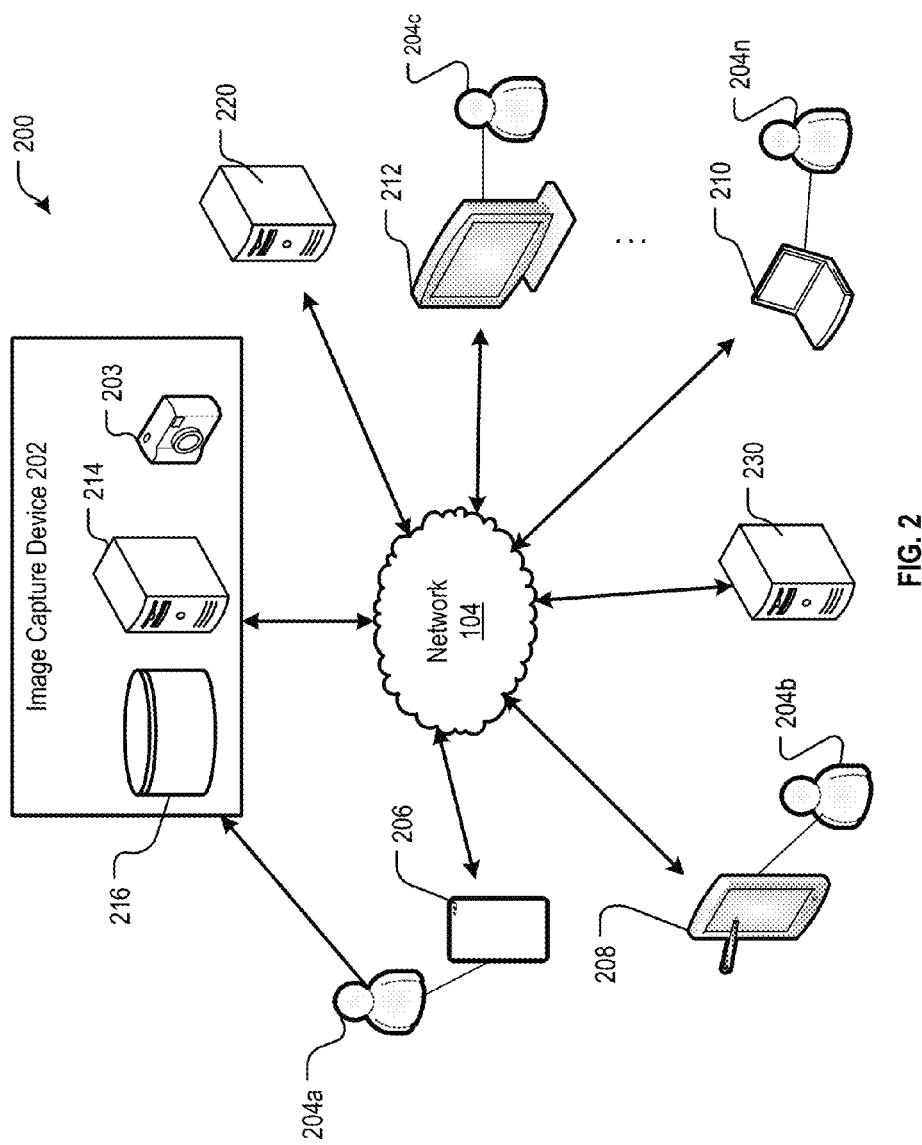
FIG. 2 is a diagram showing an example image perspective transformation system configured in communication with one or more devices over a network, in accordance with various aspects of the present disclosure.

FIG. 2 is a diagram showing one example of an environment 200 for utilizing an image capture device 202, for example, to capture images and/or transform perspectives of captured images. The environment 200 comprises image capture device 202 and users 204a, 204b, 204c, 204n. Each user 204a, 204b, 204c, and 204n may use one or more user devices such as, for example, mobile device 206, tablet computer 208, laptop computer 210, and/or display device 212. Although four users 204a, 204b, 204c, 204n are shown, any suitable number of users may be part of the environment 200. Also, although each user 204a, 204b, 204c, 204n shown in FIG. 2 is associated with a particular device (such as mobile device 206 associated with user 204a, tablet computer 208 associated with user 204b, display device 212 associated with user 204c, and laptop computer 210 associated with user 204n), each user 204a, 204b, 204c, 204n may use additional user devices or fewer user devices from what is shown. Additionally, each user 204a, 204b, 204c, 204n may use different user devices apart from what is shown in environment 200 of FIG. 2.

Image capture device 202 may perform the various utilities described herein including, for example, linear and nonlinear image perspective transformation. The image capture device 202 may comprise one or more camera modules 203, one or more servers 214, and/or one or more memories 216. In some examples, the memory 216 may store images captured by the one or more camera modules 203, or received from the various user devices, as well as instructions for performing image perspective transformation. The various components 203, 214, 216 of the image capture device 202 may be at a common geographic location and/or may be distributed across multiple geographic locations. For example, the image capture device 202 may be implemented in whole or in part as a cloud or Softare as a Service (SaaS) system. In some examples, the image capture device 202 may perform image perspective transformation on images received from multiple different users 204a, 204b, 204c, 204n (e.g., via their associated cameras, computing devices, or other devices). In various other examples, image capture device 202 may capture images using one or more camera modules 203 and may perform image perspective transformation on images received from camera modules 203. Various user devices (such as mobile device 206 associated with user 204a, tablet computer 208 associated with user 204b, display device 212 associated with user 204c, and laptop computer 210 associated with user 204n) may include a companion application effective to send instructions to image capture device 202. For example, user 204a may execute a companion application on mobile device 206 and may send commands to image capture device 202. In various examples, user 204a may use the companion application to capture images with camera module 203 and to perform image perspective transformation on images captured using camera module 203.

The various components of the environment 200 may be in communication with one another via a network 104. The network 104 may be and/or comprise any suitable wired or wireless network configured according to any suitable architecture or protocol. In some examples, the network 104 may comprise the Internet.

User devices, such as mobile device 206, tablet computer 208, display device 212, and laptop computer 210 may be utilized to control image capture device 202 to capture still and/or video images. In various examples, user devices may execute a companion application to control operation of image capture device 202. In some examples, user devices (including mobile device 206, tablet computer 208, display device 212, and/or laptop computer 210) may perform image perspective transformation on images captured by image capture device 202 and transmitted to the user devices. In some other examples, a companion application executed by the user devices may perform image perspective transformation on images captured by image capture device 202 and transmitted to the user devices. In still other examples, the image perspective transformation techniques as described herein may be performed by a combination of image capture device 202 and the user devices (including mobile device 206, tablet computer 208, display device 212, and/or laptop computer 210). In some embodiments, image capture device 202 and/or the user devices may be effective to crop and/or correct aspect ratios of images captured by image capture device 202. In some examples, user devices including mobile device 206, tablet computer 208, display device 212, and/or laptop computer 210 may be configured to communicate with other components of the environment 200 utilizing, for example, a wired or wireless connection. For example, mobile device 206, tablet computer 208, display device 212, and/or laptop computer 210 may send and receive data (such as, for example, commands and/or image data) via a wired connection, such as Universal Serial Bus (USB), or wireless connection, such as near field communication (NFC) or Bluetooth. In some examples, the user devices may be configured to receive still images and/or video directly from image capture device 202, for example, via the network 104. Although user devices are described as mobile device 206, tablet computer 208, display device 212, and/or laptop computer 210, the user devices may be any suitable type of computing device comprising at least one processor and non-transitory computer-readable memory. In some examples, the user devices may be configured to receive image frames captured by the image capture device 202 or digital camera module 203. Also, in some examples, the user devices may comprise one or more camera modules and associated optics for capturing images and/or video and either uploading the resulting frames to image capture device 202 or performing image perspective transformation on the captured image frames. In some examples, the user devices, such as mobile device 206, tablet computer 208, display device 212, and/or laptop computer 210, may be configured to communicate on a cellular or other telephone network.

In various examples, users, such as users 204a, 204b, 204c, 204 may control image capture device 202 using audible commands. For example, a user 204a may speak a "wake word" that may be an spoken audible command. A wake word may be, for example, a word or phrase for which a wake word engine of image capture device 202 continually listens. A microphone of image capture device 202 may detect the spoken wake word and, in response, subsequent audio captured by the microphone will be processed to detect further audible commands and/or the subsequent audio received by the microphone of image capture device 202 may be transmitted to a voice recognition server 220. In the example, user 204a may "wake" the image capture device 202 to further voice commands using the wake word, and may thereafter speak an audible command for image capture device to take a video or take a picture. Audio may be transmitted/streamed from image capture device 202 over network 104 to voice recognition server 220 in any audio file format, such as mp3, mp4, or the like. Voice recognition server 220 may receive the transmitted or streamed audio. Upon determining that the audio content has reached an endpoint, voice recognition server 220 may analyze the received audio stream and may translate the audio stream into natural language. Voice recognition server 220 may determine whether or not the natural language corresponds to a command. If so, the voice recognition server 220 may send the command over network 104 to image capture device 202. For example, a user 204a may speak the command, "Take a picture" to image capture device 202. Image capture device 202 may transmit the voice command to voice recognition server 220. Voice recognition server 220 may analyze the audio stream and may translate the audio stream into natural language. Voice recognition server 220 may determine that the natural language "Take a picture" corresponds to a command effective to instruct image capture device 202 to capture an image using a camera module 203. Voice recognition server 220 may send the command over network 104 to image capture device 202. The command may be effective to cause image capture device 202 to capture an image using a camera module 203. In some embodiments, the microphone for capturing voice commands may be provided on a different device separate from the image capture device 102 (e.g., remote display device 108). The processing of the voice command and/or transmission of the audio to the voice recognition server 220 may similarly be performed by a device other than the image capture device 102.

In various examples in which image capture device 202 is implemented at least in part in a cloud service or SaaS environment, image perspective transformation, as described herein, may be performed at an image transformation server 230. Although depicted as different computing devices in FIG. 2, in some examples, image transformation server 230 and voice recognition server 220 may be implemented in the same housing. In various examples, image transformation server 230 may receive image data captured by image capture device 202 via network 104. In addition, image capture device 202 may send other data to image transformation server 230. For example, image capture device 202 may send pitch angle information, roll angle information, accelerometer data or other positional or geospatial data, and/or one or more depth maps to image transformation server 230. As will be discussed in further detail below, image transformation server 230 may perform image perspective transformation of image data received from image capture device 202 based on data received from image capture device 202. After performing image perspective transformation in accordance with the various techniques described herein, image transformation server 230 may send perspective-transformed images over network 104 to one or more user devices and/or other computing devices, such as, for example, a social media server. In some examples, perspective-transformed images may be sent to a computer vision system (not shown). The computer vision system may be programmed to recognize various features of a subject or subjects depicted in the perspective-transformed images. For example, the computer vision system may be programmed to recognize a face of a subject. In some other examples, the computer vision system may be programmed to recognize articles of clothing worn by a subject. Clothes may be identified by matching a particular item being worn by a subject to a particular item of clothing known to have been purchased by the user of image capture device 202 or stored in a database, such as an online-shopping catalog database. For example, the computer vision system may be in communication with one or more other computing systems that include profile information related to the subject. The computer vision system may identify particular articles of clothing worn by a subject by querying other computer systems, such as a server of an online-shopping website from which the user has purchased those articles of clothing. Similarly, the computer vision system may identify a subject by querying a computer system hosting a social media platform, which can provide to the computer vision system information about the subject (e.g., information about clothing purchased by the subject, worn by the subject in photos available to the social media platform, or other types of information available to social media platforms) to assist with the identification of that clothing by the computer vision system. In various examples, the computer vision system may be effective to insert metadata into the perspective-transformed image. The metadata may comprise a metadata "tag," or a hyperlink that, which selected by the user, will direct the user to a retail website where the particular article of clothing can be purchased. In various examples, computer vision systems may be more likely to correctly identify articles of clothing depicted in perspective-transformed images relative to non-transformed images, because the perspective-transformed images may more accurately depict the clothing. For example, when a user of image capture device 202 captures a downward-angled image of the user, the pants of the user may appear foreshortened and/or otherwise distorted and may therefore be difficult to identify by a computer vision system. A perspective-transformed image, in accordance with techniques described herein, may present an image of the user's pants that more closely conforms to image data representing the pants on a retail server. As a result, the pants may be more easily recognizable by the computer vision system after image perspective transformation.

Figure 3:
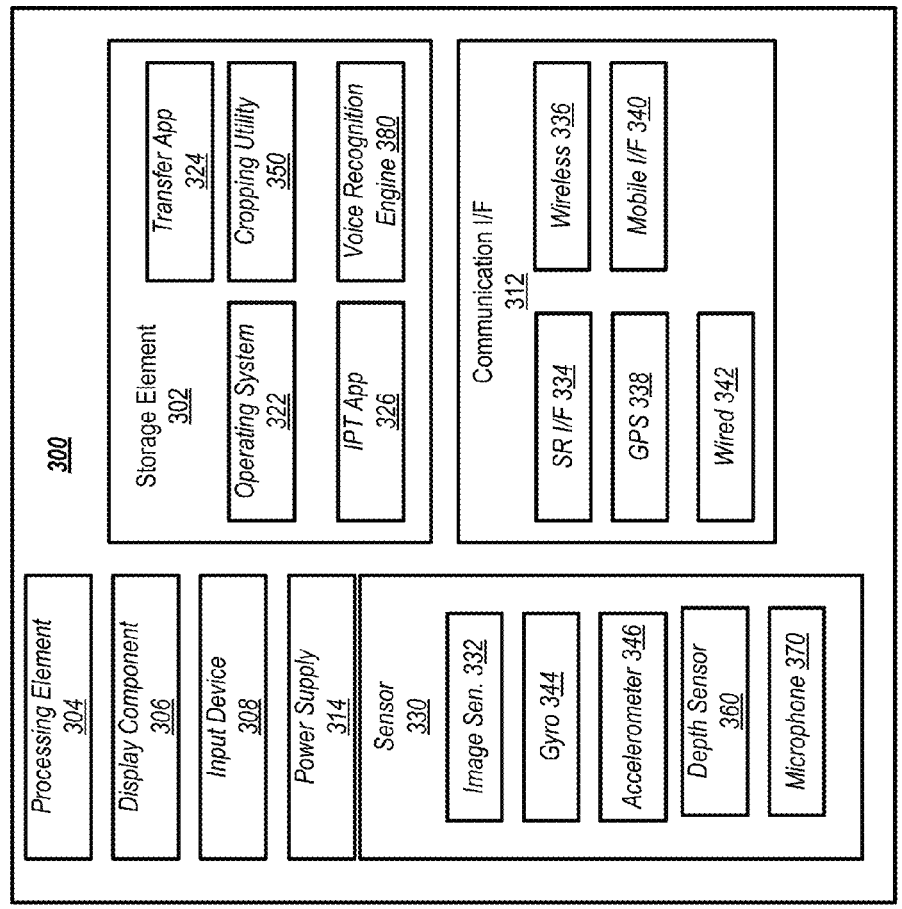
FIG. 3 is a block diagram showing an example architecture of a user device, in accordance with various embodiments described herein.

FIG. 3 is a block diagram showing an example architecture 300 of a user device, such as the image capture devices, camera modules, display devices, mobile devices, and other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). The storage element 302 can include one or more different types of memory, data storage or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to receive images and/or video from another device (e.g., a mobile device, image capture device, and/or display device) or from an image sensor 332 included in the architecture 300. In some examples, the transfer application 324 may also be configured to upload the received images to another device that may perform processing as described herein (e.g., a mobile device, another computing device, or image capture device 202). In some examples, an image perspective transformation (IPT) application 326 may perform processing on image frames captured by an image capture device 202 or camera module of the architecture 300 and/or from another device. The image perspective transformation application 326 may be included, for example, at an image capture device 202 (shown in FIG. 2), a digital camera, a display device 108 (shown in FIG. 1), a user device, or another computer system. In some examples, where image perspective transformation is performed by an image transformation server 230, a remote display device 108, and/or another component of the environment 200 (shown in FIG. 2), the image perspective transformation application 326 may be omitted from architecture 300. A cropping utility 350 may crop image frames and/or correct aspect ratios of video received from image capture device 202 or from another camera module or computing device. In some examples, image perspective transformation application 326 may be effective to perform linear and nonlinear correction as described herein. In some other examples, image perspective transformation application 326 may perform only nonlinear image perspective transformation or only linear image perspective transformation, while a different application stored in storage element 302 performs the remaining image perspective transformations.

When implemented in some user devices, the architecture 300 may also comprise a display component 306. The display component 206 may comprise one or more light-emitting diodes (LEDs) or other suitable display lamps. Also, in some examples, the display component 206 may comprise, for example, one or more devices such as cathode ray tubes (CRTs), liquid-crystal display (LCD) screens, gas plasma-based flat panel displays, LCD projectors, or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis, as described above in reference to FIG. 2. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices such as the user devices depicted in FIG. 2 (including mobile device 206 associated with user 204a, tablet computer 208 associated with user 204b, display device 212 associated with user 204c, and laptop computer 210 associated with user 204n). For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples where architecture 300 represents image capture device 102 (shown in FIG. 1), mobile interface 340 may allow image capture device 102 to communicate with one or more other computing devices such as the computing devices shown in FIG. 2. For example, image capture device 102 may receive a command from a user device, an application of a user device, or a voice recognition server to capture an image. Image capture device 102 may receive a command from the user device to send the captured image frame to the mobile device or to a social media site. Image capture device 102 and/or the mobile device may be effective to detect a pitch angle of the image capture device 102 and may perform image perspective transformation of the captured image frame.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output. Motion sensors may include any sensors that sense motion of the architecture including, for example, gyro sensors 344 and accelerometers 346. Motion sensors, in some examples, may be used to determine an orientation, such as a pitch angle and/or a roll angle, of image capture device 102 (shown in FIG. 1). The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338. Depth sensor 360 may be effective to determine a distance between a surface, such as subject 110 and/or image plane 130 and image capture device 102 (shown in FIG. 1). In some examples, the depth sensor 360 may determine the contours of the surface and may be capable of using computer vision techniques to recognize facial patterns or other markers within the field of view of the depth sensor 360's camera. In some examples, the depth sensor 360 may include an infrared projector and camera. Processing element 304 may build a depth map based on detection by the infrared camera of a pattern of structured light displayed on a surface by the infrared projector. In some other examples, the depth sensor 360 may include a time of flight camera that may compute distance based on the speed of light by measuring the time of flight of a light signal between a camera of the depth sensor 360 and a surface, such as subject 110 or image planes 130, 131 shown in FIG. 1. In various examples, depth sensor 360 may be effective to determine the pitch angle and/or roll angle of image capture device 102. Further, in some examples, processing element 304 may be effective to determine the location of various objects in the physical environment within the field of view of image capture device 102 based on the depth map created by the depth sensor 360. For example, processing element 304 may determine a location of the feet of a human subject 110 based on a depth map of the subject 110.

Figure 4:
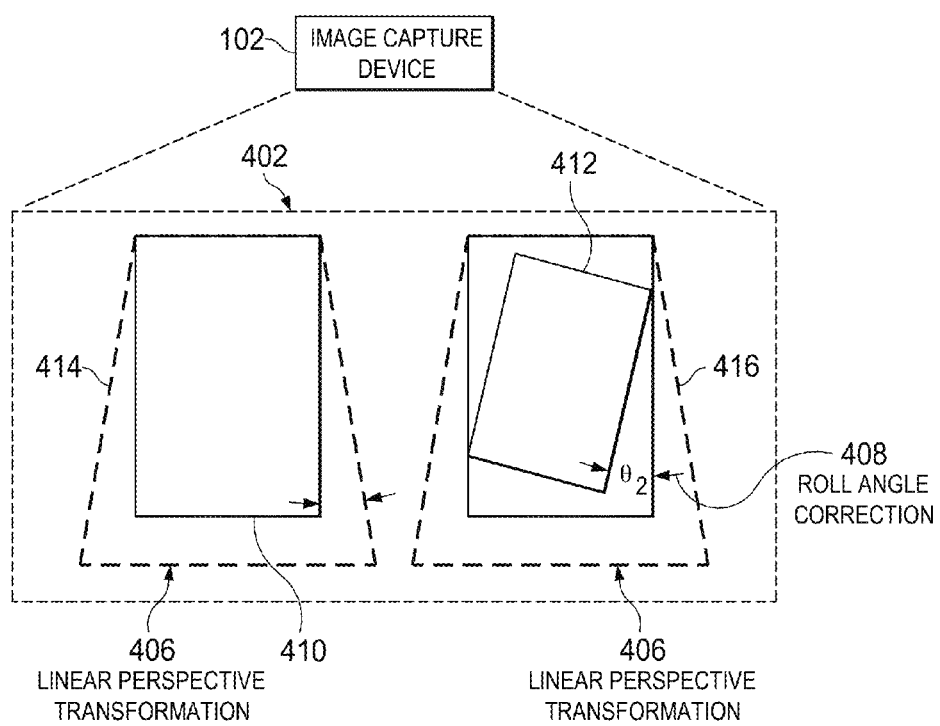
FIG. 4 depicts an image capture device performing linear image perspective transformation and roll transformation, in accordance with an aspect of the present disclosure.

FIG. 4 depicts image capture device 102 performing linear image perspective transformation and roll transformation, in accordance with an aspect of the present disclosure. Those components that have been previously described in reference to FIGS. 1-3 may not be described again herein, for purposes of clarity and brevity. Although the embodiment depicted in FIG. 4 shows image capture device 102 performing linear image perspective transformation, other devices (e.g., image perspective transformation server 230 depicted in FIG. 2) may be effective to perform linear image perspective transformation, in accordance with various embodiments. Although the embodiment depicted in FIG. 4 shows examples of perspective transformation with roll-angle correction, it should be noted that, in some cases, linear perspective transformation and roll-angle correction may be performed independently. In some further examples, and as described in further detail below, linear perspective transformation and roll-angle correction may be performed in parallel with nonlinear correction. Although in FIG. 4, linear perspective transformation and/or roll-angle correction are depicted as being performed by image capture device 102, these techniques may, in various examples, be instead performed by display device 108 (shown in FIG. 1) and/or by the various user devices shown in environment 200 depicted in FIG. 2.

As shown in FIG. 1, image capture device 102 may capture an image while positioned at a pitch angle θ relative to a horizontal surface or other surface of environment 100. In FIG. 4 such an image may be represented by the solid-lined rectangles referred to herein as pre-correction image frames 410 and 412. Capturing images from a pitch angle θ may cause the portions of the environment 100 depicted in the images to appear disproportionate. For example, the head and upper torso of a human subject 110 may appear disproportionately large relative to the subject 110's legs and feet, which may appear disproportionately small in an image captured by image capture device 102 from a downward pitch angle θ. Accordingly, image capture device 102 may perform linear perspective transformation 406, which may stretch the lower part of the image frame to form the resulting transformed image frame 414 (shown in dashed lines in FIG. 4). Transformed image frame 414 may appear more proportionate relative to pre-correction image frame 410 when rendered on a display. In the example provided above, linear perspective transformation 406 may be effective to linearly stretch the lower portions of the pre-correction image frame 410 to be wider and longer than to account for the apparent foreshortening of the legs of the human subject. To perform linear perspective transformation 406, image capture device 102 may correct the image based on a distortion factor represented in equation (1):

$$\frac{\cos(\frac{\alpha}{2} - \theta)}{\cos(\frac{\alpha}{2} + \theta)} \quad (1)$$

where θ is the pitch angle (shown in FIG. 1), and α is the field of view (shown in FIG. 1) of image capture device 102. In various examples, image capture device 102 may use an accelerometer or depth sensor to determine angles such as α and/or θ. The image may be stretched during linear perspective transformation in any of a variety of ways, such as by adding rows of pixels to the image. For example, to perform linear perspective transformation on an image captured with a downward-angled image capture device 102, the number of pixels added may increase linearly while traversing the two-dimensional pixel grid representing the image from top to bottom. Pixel values may be calculated for the added pixels using linear interpolation to determine intermediate pixel values for the added pixels based on the values of the original pixels surrounding the newly added pixels.

In some examples where the pitch angle θ is relatively large, the linear perspective transformation 406 may result in the bottom portion of images appearing to be overly and/or disproportionately wide. To alleviate this effect, a strength parameter may be introduced to reduce the effects of the linear perspective transformation 406. The strength parameter may be applied to the pitch angle θ to produce an effective pitch angle. In various examples, the effective pitch angle may be the product of the pitch angle θ and the strength parameter. As will be described in further detail below, in some examples, a particular strength parameter may be associated with a particular pitch angle θ in a lookup table stored in a memory of image capture device 102, display device 108, and/or another computing device of environment 100. The strength parameter may be used to modulate the linear perspective transformation.

Further, image capture device 102 may use a depth sensor, accelerometer, and/or other position sensor to determine a roll-angle $θ_2$. Image capture device 102 may perform roll-angle correction 408 to correct for a roll-angle $θ_2$ of the optical axis of image capture device 102. For example, image capture device 102 may perform roll angle correction 408 by rotating the pre-correction image frame 412 by a number of degrees that is substantially equal to the negative of the roll-angle $θ_2$.

Figure 5:
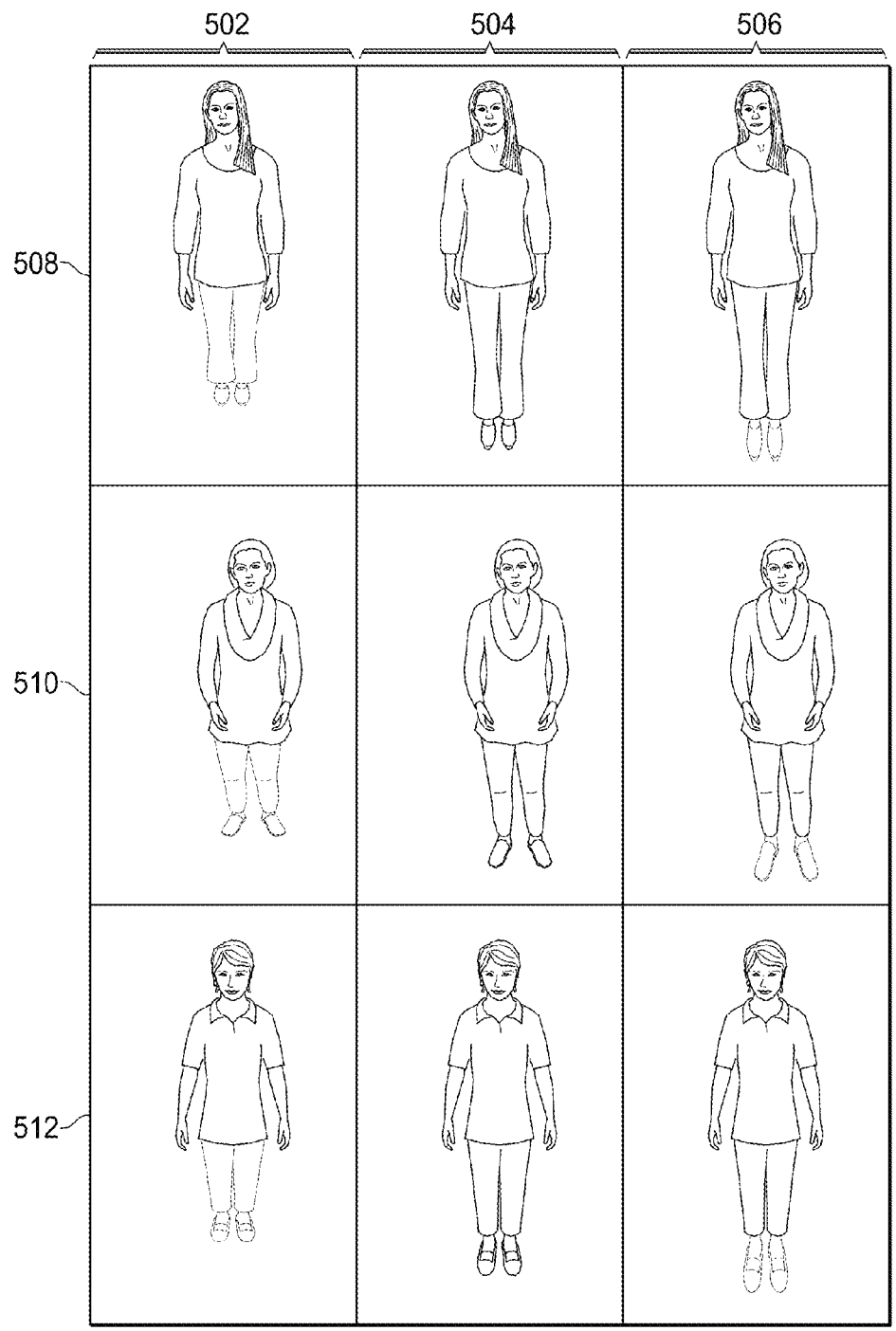
FIG. 5 depicts examples of untransformed images, images transformed with linear perspective transformation, and images transformed with both linear and nonlinear image perspective transformation, in accordance with various aspects of the present disclosure.

FIG. 5 depicts examples of untransformed images, images transformed with linear perspective transformation, and images transformed with both linear and nonlinear image perspective transformation, in accordance with various aspects of the present disclosure. In some instances, those components described earlier in reference to FIGS. 1-4 may not be described again herein for purposes of clarity and brevity.

In FIG. 5, three different images of three different subjects are shown. Row 508 depicts a first subject, row 510 depicts a second subject, and row 512 depicts a third subject. Columns 502, 504, and 506 show images captured by an image capture device 102 disposed above the subjects' heads and angled downward toward the subject at a pitch angle θ. The images depicted in column 502 are unaltered images that have experienced no image perspective transformation. As can be seen, the lower bodies of the three subjects in rows 508, 510, and 512 of column 502 appear to be disproportionately foreshortened.

The images depicted in column 506 have undergone linear perspective transformation 406. As can be seen, the legs of the subjects in the images in column 506 appear longer relative to the legs of the subjects in the images in column 502. However, in column 506, the feet of the subjects appear abnormally long. This is due to the fact that portions of the feet do not reside in the same relatively vertical plane as the majority of the standing human subjects. Instead, the feet of the subjects are disposed in a plane that is substantially orthoganol to the relatively vertically oriented, standing human subject. As such, when linear perspective transformation 406 is applied to the unaltered images shown in column 502, the feet of the subjects are stretched in a linear manner along with the other features in the vertical plane of the standing human subject, resulting in feet that appear to be overly long and disproportionate to the subject (as shown in column 506).

The images depicted in column 504 have undergone linear perspective transformation 406 as well as nonlinear perspective transformation. As described in further detail below, nonlinear image perspective transformation may be applied to portions of the subject that reside outside the vertical plane (e.g., image plane 130 depicted in FIG. 1). Nonlinear image perspective transformation may compress those portions of the subject that reside outside of the relatively vertical plane of the majority of the subject's body. In the example described above, the feet of the subject may be disposed in a relatively horizontal plane 131 and may be compressed to avoid the disproportionately stretched feet shown in column 506. As shown in the images of the subjects depicted in column 504, the legs and lower bodies of the three subjects appear proportionate and lengthened relative to the unaltered images shown in column 502. Additionally, the feet of the subjects in column 504 appear to be proportionate to the subject's body due to nonlinear perspective transformation. Linear perspective transformation, nonlinear perspective transformation, and roll angle correction may be performed either in parallel or in series by image capture device 102, display device 108, image transformation server 230, and/or other user devices, such as mobile device 206, tablet computer 208, display device 212, and laptop computer 210 (described in reference to FIG. 2), or some combination thereof.

After linear image perspective transformation and/or after a combination of linear and nonlinear perspective transformation, resulting images may have an aspect ratio that is less than the original image frames. For example, the subjects of the images in column 504 and column 506 (referred to herein as "perspective-transformed images") are taller relative to the untransformed images in column 502. In various applications, such as video, it may be desirable to maintain the aspect ratio of the original image.

In one example, the aspect ratio of the original, untransformed image may be maintained by padding the sides of the perspective-transformed image with a solid color. In another example, the aspect ratio of the original, untransformed image may be maintained by padding the sides of the perspective-transformed image with one or more columns of pixels along the lateral edges (left and right) of the perspective-transformed image frame. The one or more columns of pixels may be progressively blurred or blended to give the impression of uniformity at the lateral edges of the image frame. In yet another example, the aspect ratio of the original, untransformed image may be maintained by progressively stretching pixels along the lateral edges (left and right) of the perspective-transformed image frame such that pixels nearest to the edge are wider while pixels closer to the center of the image frame are stretched less. In still another example, the aspect ratio of the original, untransformed image may be maintained by retargetting pixels from the image to areas of the image frame close to the lateral edges of the frame. In various examples, certain "seams" in the image may be identified and copied for retargetting in order to resize the image and achieve a particular aspect ratio.

In some other examples, the aspect ratio of the original, untransformed image may be maintained by cropping the image vertically. For example, the perspective-transformed image may be cropped to the center by cropping an equal area from the top and bottom of the image frame. In another example, the perspective-transformed image may be cropped to the top, cropping only from the bottom of the image. Cropping to the top may be an acceptable means of maintaining the aspect ratio of the original, untransformed image when it is important to avoid cutting off the head of a human subject depicted in the image frame. In another example, cropping may be done at a specified ratio between the top and the bottom of the image. Such cropping may be skewed so that more of the image is cropped from the bottom than the top, to avoid cropping the heads off of human subjects in the image frame. Finally, in examples where image capture device includes a depth sensor, computer vision techniques may be employed to detect the body and/or face of a subject to ensure that the head of the subject is never cropped off. Additionally, various combination of the techniques described above for maintaining aspect ratios of the original, untransformed image may be employed.

Figure 6:
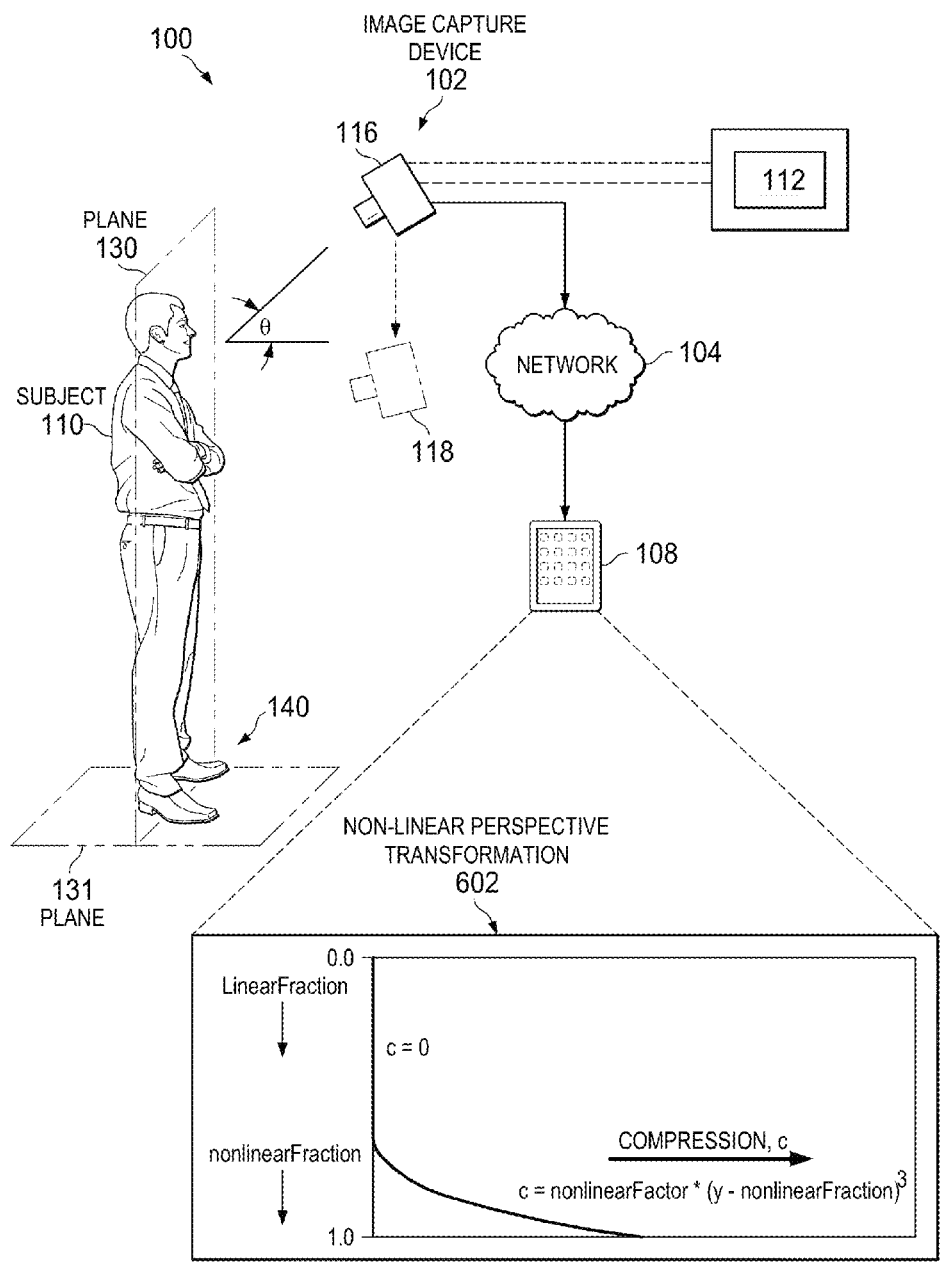
FIG. 6 depicts an example of nonlinear perspective transformation, in accordance with another aspect of the present disclosure.

FIG. 6 depicts an example of nonlinear perspective transformation, in accordance with another aspect of the present disclosure. Those components described above in reference to FIGS. 1-5 may not be described again for purposes of brevity and clarity.

As discussed, portions of the subject 110 that are not disposed within the vertical image plane 130 of the standing subject 110 may appear overly long or stretched after performing a linear perspective transformation 406 (shown in FIG. 4) to the image frame. Accordingly, a nonlinear perspective transformation 602 may be performed to the image plane. Although in the example depicted in FIG. 6 display device 108 is shown performing the nonlinear perspective transformation 602, in various other examples, image capture device 102, and/or another computing device may perform the nonlinear perspective transformation 602.

Nonlinear perspective transformation 602 may comprise compressing a portion (sometimes referred to herein as a "fraction") of the image in a vertical direction. In various examples, the fraction of the image to be compressed may be determined based on the pitch angle $\theta$ of the image capture device 102. In some examples, the larger the pitch angle, the larger the fraction of the image that will be compressed. The fraction of the image to be compressed may be referred to as the nonlinear fraction. In examples where image capture device 102 includes a depth sensor, the depth sensor may be effective to detect portions or features of environment 100 nonlinear are disposed outside of image plane 130. In various examples, image plane 130 may be the primary image plane of the subject 110. In other words, image plane 130 may be a plane in nonlinear the majority of subject 110 is disposed from the perspective of image capture device 102. For example, if subject 110 is a standing human, the primary image plane 130 may oriented in a substantially vertical fashion, from the head of the subject 110 down to the floor. In the example, a depth sensor of image capture device 102 may detect the feet 140 of subject 110. The feet 140 of subject 110 may be determined to be outside of the primary image plane 130, as they may be disposed in a plane that is different from and intersects the primary image plane 130. The image capture device 102 may determine the nonlinear fraction based on the identification of portions of the environment 100 that are disposed outside of the primary image plane 130. In the example, the image capture device 102 may determine that the nonlinear Fraction should be "0.9" based on information from the depth sensor indicating that feet 140 begin at a position that is 0.9 times the height of the subject 110 (when traversing the subject downward from head to feet). As described in further detail below, the nonlinear fraction may also be pre-determined and stored in a lookup table in association with a particular pitch angle θ.

As shown in FIG. 6, the compression value c represents an amount to compress an image and may be increased in a nonlinear manner while traversing the image vertically. For example, in the nonlinear perspective transformation 602 shown in FIG. 6, in the linear fraction of the image, the compression value, c, may be zero until reaching the nonlinear fraction. Compression may be increased in the nonlinear fraction according to equation (2):

$$c = \text{nonlinearFactor} \cdot (y - \text{nonlinearFraction})^3 \quad (2)$$

where c is the compression value, y is the vertical position for which a particular compression value c is being calculated in image plane 130, nonlinearFraction is the fraction of the image to be compressed (e.g., where c>0), and nonlinearFactor is a compression factor to be optimized based on the particular pitch angle θ of the image capture device 102. As depicted in nonlinear perspective transformation 602, the rate of compression value c is increased according to equation (2) as the nonlinearFraction of the image frame is traversed in the downward y-direction. It should be noted that equation (2) is for illustrative purposes only. Other equations may be used to determine a nonlinear compression value c to be applied to a portion of an image, in accordance with the present disclosure. In various examples, a compression value c, calculated for a vertical position y, may be applied to a corresponding pixel or group of pixels at vertical position y to compress the pixel or group of pixels. Compression values c may be applied to pixels for each corresponding vertical position y of the nonlinear portion of the linearly stretched image to generate a nonlinearly compressed image.

Figure 7:
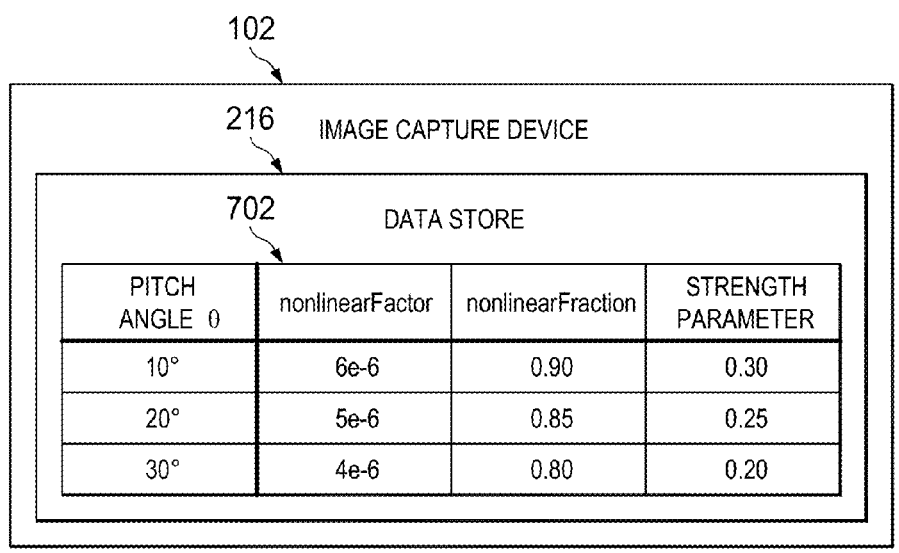
FIG. 7 depicts an automation table, in accordance with various embodiments of the present disclosure.

FIG. 7 depicts an automation table 702, in accordance with various embodiments of the present disclosure. Those components of FIGS. 1-6 that have been previously described may not be described again for purposes of clarity and brevity. Although in FIG. 7, the automation table 702 is shown stored by a memory 216 of image capture device 102, in various examples, automation table 702 may instead be stored by a memory of display device 108 (shown in FIG. 1) and/or by respective memories of the various user devices shown in environment 200, depicted in FIG. 2.

In some examples, various parameters for linear perspective transformation and/or nonlinear perspective transformation may be stored in automation table 702 in association with particular pitch angles θ. In some examples, a nonlinearFactor and nonlinearFraction may be stored in association with a particular pitch angle for performing nonlinear image perspective transformation for images captured from the particular pitch angle. Similarly, a strength parameter may be stored in automation table 702 for performing linear perspective transformation for images captured from the particular pitch angle.

In some examples, parameters stored in automation table 702 may be determined by placing markers on a mannequin and/or test subject representative of various body shapes and photographing the mannequins and/or test subjects from both the particular pitch angles θ and the angle to be simulated by the linear perspective transformation. Least-squares regression may be applied to marker positions detected in images captured from each position of image capture device 102 to find parameters that best transform the test image. Thereafter, when image capture device 102 captures an image of a particular subject, image capture device 102 may determine the appropriate pitch angle using a depth sensor or accelerometer, as described previously, and may use the parameters associated with the determined pitch angle in automation table 702 to perform linear and/or nonlinear perspective transformation.

Figure 8:
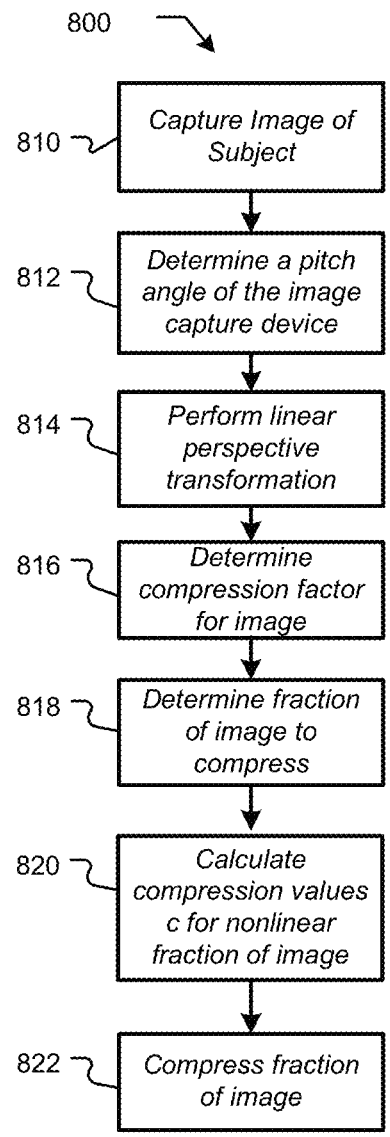
FIG. 8 depicts a process flow that may be executed by a computing device to perform an image perspective transformation, in accordance with various aspects of the present disclosure.

FIG. 8 is a flow chart showing an example of a process flow 800 that may be executed by an image capture device or other computing device to perform an image perspective transformation, in accordance with various aspects of the present disclosure. The actions of process flow 800 may represent a series of instructions comprising computer-readable machine code executable by a processing unit of a computing device and/or by an image capture device, such as image capture device 102. In various examples, the computer-readable machine code may be comprised of instructions selected from a native instruction set of the computing device and/or an operating system of the computing device. Various actions in process flow 800 may be described with reference to elements of FIGS. 1-7.

At action 810 of process flow 800, image capture device 102 may capture an image of a subject, such as subject 110 of FIG. 1. As described previously, in some examples, image capture device 102 may include a camera, a processor, and/or a memory.

Processing may continue from action 810 to action 812, "Determine a pitch angle of the image capture device." At action 812, a pitch angle θ of the image capture device 102 may be determined. In various examples, an accelerometer of image capture device 102 may use changes in the acceleration due to gravity of the image capture device to determine the pitch angle of image capture device 102 relative to a surface of environment 100. In some other examples, image capture device 102 may comprise a depth sensor effective to create a depth map of environment 100. Image capture device 102 may use the depth map of environment 100 (including subject 110) to determine the pitch angle θ.

Processing may continue from action 812 to action 814, "Perform linear perspective transformation." At action 814, a linear perspective transformation may be applied to the image capture by image capture device 102 such that the image appears to have been captured from a different perspective. For example, although image capture device 102 may be disposed at position 116 in FIG. 1 with a first pitch angle θ when capturing an image of subject 110, image perspective transformation 112 may be effective to transform the image of subject 110 to simulate an image captured from an image capture device at position 118 with a second pitch angle θ'. When image capture device 102 is angled downward toward subject 110 from above, linear perspective transformation may progressively stretch the lower part of the image to reduce or eliminate foreshortening caused by the downward-angled perspective. The image may be stretched during linear perspective transformation by adding rows of pixels to the image. For example, to perform linear perspective transformation on an image captured with a downward-angled image capture device 102, the number of pixels added may increase linearly while traversing the two-dimensional pixel grid representing the image from top to bottom. Pixel values may be calculated for added pixels using linear interpolation to determine intermediate pixel values for added pixels based on the values of the original pixels surrounding the newly added pixels. In some examples, a strength parameter may be used to reduce the effects of the linear perspective transformation. The strength parameter may be multiplied with the pitch angle θ to produce an effective pitch angle.

Processing may continue from action 814 to action 816, "Determine compression factor for image." At action 816 a compression factor may be determined for the captured image. The compression factor may affect the amount of compression for a nonlinear fraction of the image. In some examples, the compression factor may be associated with a particular pitch angle θ in a lookup table. In various other examples, the compression factor may be manually chosen or empirically determined based on a particular environment 100.

Processing may continue from action 816 to action 818, "Determine fraction of image to compress." At action 818, the fraction of the image to be compressed may be determined. In various examples, the fraction of the image to be compressed may be based on a determination of features of subject 110 that are disposed outside image plane 130 of subject 110. The fraction of the image to compress may be further based on the pitch angle θ of image capture device 102, which may in turn affect the degree to which certain features of subject 110 appear to be located outside of image plane 130.

Processing may continue from action 818 to action 820, "Calculate compression values c for nonlinear fraction of image." At action 820, the compression values c may be determined for the nonlinear fraction of the image determined at action 818. Compression values c for particular portions of the image may be calculated using equation (2), based on the different vertical positions y for which a particular compression value c is being calculated.

Processing may continue from action 820 to action 822, "Compress fraction of image." At action 822 the nonlinear fraction of the image may be compressed according to the compression values c calculated at action 820. The compression may comprise applying compression values c to one or more pixels at corresponding vertical position y to compress the one or more pixels. The nonlinear fraction (sometimes referred to herein as the "nonlinear portion") of the image may be traversed, applying compression values c to pixels at corresponding vertical positions y to generate a nonlinearly compressed image. After compression, those features of subject 110 that are not in image plane 130 (e.g., the feet of a subject) may appear more proportionate relative to the subject's body.

Figure 9:
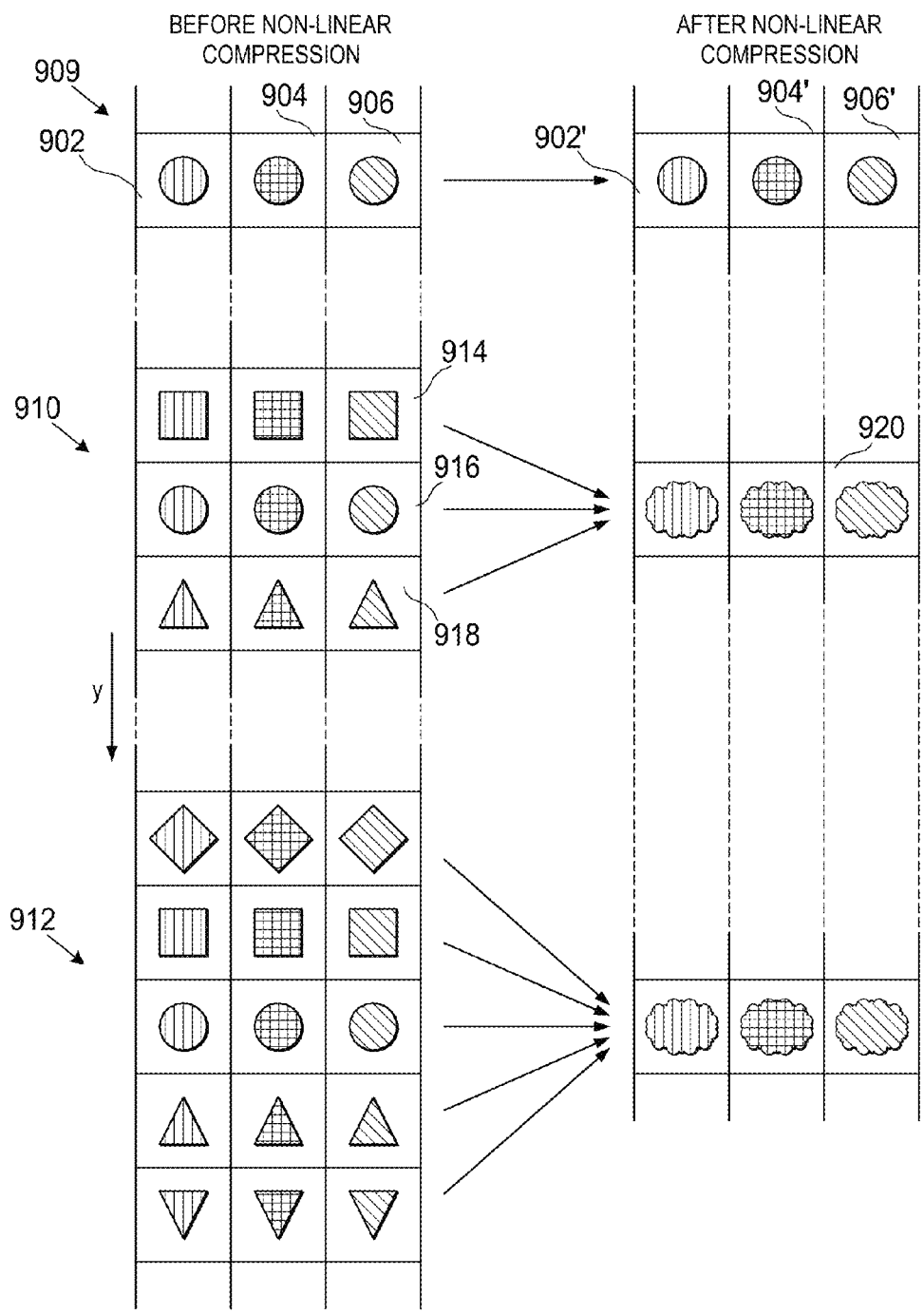
FIG. 9 depicts an example of nonlinear compression, in accordance with various aspects of the present disclosure.

FIG. 9 depicts an example of nonlinear compression, in accordance with various embodiments of the present disclosure. Those components of FIGS. 1-8 that have been previously described may not be described again for purposes of clarity and brevity.

In at least some examples, the "compression" (such as the nonlinear compression described above with respect to FIG. 6) refers to compressing portions of the image captured by image capture device 102. Such compression may be achieved by representing multiple pixels as a single pixel. For example, FIG. 9 depicts a representation of nonlinear compression in the nonlinear fraction of an image. Each square, such as squares 902, 904, and 906, represents a pixel. Different pixel values (such as, for example, color values) are represented by different shapes.

At the portion of the image where the vertical position y equals the nonlinearFraction, the compression value c will be zero according to equation (2), above. Accordingly, at the top of the nonlinear fraction 909 depicted in FIG. 9, no compression occurs and the color values of pixels 902, 904, 906 do not change after nonlinear compression. As such, the circle shapes representing the pixel values 902', 904', 906' do not change after nonlinear compression. As y increases while traversing the image in a downward direction, the compression values c increase according to equation (2). Compression values c may relate to the number of pixels to be aggregated, blended, retargeted, combined and/or otherwise scaled to be represented as a single, "compressed" pixel value at a pixel location shown in the "After Nonlinear Compression" column of FIG. 9. For example, the pixel values of 3 pixels may be combined into a single, compressed pixel value for a pixel at a particular location, as shown in the middle transformation 910 of FIG. 9. The compressed pixel value may represent an average of the color values of the 3 pixels that were compressed or otherwise combined to form the compressed pixel value. For example, in FIG. 9, pixel values of pixels 914, 916, and 918 are combined and represented by the compressed pixel value at pixel 920 after nonlinear compression. In various other examples, the compressed pixel values resulting from nonlinear compression may take target color values of a pixel at a specified location, according to the particular algorithm used to generate the nonlinear compression. As the nonlinear fraction of the image is traversed in a downward direction from the top of the image frame to the bottom of the image frame during nonlinear compression, y increases. Accordingly, the compression values c increase as the argument of (y−nonlinearFraction) grows larger. As such, at the bottom transformation 912, three groups of 5 pixels are shown being combined into three groups of single pixels. Accordingly, the compression value c relates to a number of pixels to be combined and represented by a single pixel for a particular position y.

Among other potential benefits, a system in accordance with the present disclosure may allow digital photographs taken from a variety of angles to appear proportionate. For example, "selfie" photographs are often taken from above the head of a subject, such that the optical axis of the camera capturing the selfie is facing down toward the head of the subject. The system and techniques described herein may allow such photographs to appear more natural and proportionate and may effectively eliminate foreshortening of certain areas of the photograph, such as the legs and lower body of a model in a downward-angled "selfie" photo. Additionally, employing nonlinear perspective transformation, as described herein, may compress portions of the subject that are not in the vertical image plane, allowing such portions to appear proportionate and eliminating the overly stretched look that may result from using linear perspective transformation alone. Features of a subject may be more easily identified in an image that has been transformed using both linear and nonlinear image perspective transformation, in accordance with techniques described in the present disclosure. For example, image perspective transformation may allow for improved identification of a subject's clothing when using computer vision techniques to identify features of a particular image.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method to transform an image perspective, the method comprising:
    capturing, by an image capture device, an image of a person in a field of view of the image capture device, wherein legs of the person are depicted in the image having a first length;
    determining a first downward pitch angle associated with the image capture device relative to a floor of a room in which the image capture device is located;
    performing a linear perspective transformation of the image by progressively adding more pixels to the image to produce a linearly stretched image in which the legs of the person are depicted in the linearly stretched image having a second length longer than the first length;
    identifying a compression factor associated with the first downward pitch angle in a lookup table, wherein the compression factor relates to a predetermined amount of compression to be applied to the linearly stretched image to correct for an excessively stretched depiction of feet of the person in the linearly stretched image;
    identifying a lower portion of the linearly stretched image to compress, the lower portion being associated with the first downward pitch angle in the lookup table, wherein the lower portion comprises a first region and a second region below the first region;
    calculating a first compression value for the first region using the compression factor, wherein the first compression value relates to a first number of pixels to be represented by a first single pixel as a first compressed pixel value;
    calculating a second compression value greater than the first compression value for the second region using the compression factor, wherein the second compression value relates to a second number of pixels greater than the first number of pixels to be represented by a second single pixel as a second compressed pixel value;
    representing the first number of pixels in the first region with the first compressed pixel value; and
    representing the second number of pixels in the second region with the second compressed pixel value.

2. The method of claim 1, further comprising determining an effective pitch angle by multiplying the first downward pitch angle by a strength parameter, wherein the strength parameter is a value less than 1 effective to modulate the linear perspective transformation, wherein performing the linear perspective transformation of the image to produce the linearly stretched image comprises modulating a third number of pixels to be progressively added to the image to reduce a foreshortening effect in the image in which the legs of the person are depicted in the image as disproportionately short relative to a torso of the person.

3. The method of claim 1, further comprising:
    identifying a location of a foot of the person using a depth sensor, wherein the second region corresponds to the location of the foot.

4. The method of claim 1, further comprising:
    storing in a memory associated with the image capture device the first downward pitch angle as a first pitch angle;
    storing in the memory associated with the image capture device the compression factor in association with the first pitch angle;
    storing in the memory associated with the image capture device a nonlinear fraction value corresponding to the lower portion of the linearly stretched image to compress in association with the first pitch angle;
    capturing, by the image capture device, a second image;

determining a second downward pitch angle of the image capture device relative to the floor of the room;

determining that the second downward pitch angle is equal to the first downward pitch angle; and searching the memory by inputting the second downward pitch angle as a search query to identify the compression factor and the nonlinear fraction value corresponding to the lower portion of the linearly stretched image to compress.

5. A computer-implemented method to transform a perspective of an image, the method comprising:

determining a pitch angle of an image capture device;

generating, by at least one processor, a transformed image by performing a linear perspective transformation to the image;

determining, by the at least one processor, at least one compression value for a portion of the transformed image, wherein the at least one compression value is based at least in part on the pitch angle; and generating, by the at least one processor, a nonlinearly transformed image based at least in part on the portion and the at least one compression value.

6. The computer-implemented method of claim 5, further comprising:

identifying a subject of the image;

identifying a feature of the subject; and determining a size of the portion based at least in part on a location of the feature of the subject.

7. The computer-implemented method of claim 5, further comprising:

identifying a strength parameter associated with the pitch angle, wherein the strength parameter is effective to modulate the linear perspective transformation;

determining an effective pitch angle based at least in part on the strength parameter; and performing the linear perspective transformation based at least in part on the effective pitch angle.

8. The computer-implemented method of claim 5, further comprising:

generating, by the image capture device, a depth map; and determining the pitch angle of the image capture device based at least in part on the depth map.

9. The computer-implemented method of claim 8, further comprising:

identifying, based at least in part on the depth map, an image plane of a subject of the image, wherein the image plane is a focal plane of the image capture device;

identifying, based at least in part on the depth map, a feature of the subject disposed closer to the image capture device relative to the image plane; and determining a size of the portion based at least in part on a location of the feature.

10. The computer-implemented method of claim 5, further comprising:

searching a memory using the pitch angle to determine a compression factor associated with the pitch angle;

wherein the determining the at least one compression value for the portion of the transformed image is further based at least in part on the compression factor.

11. The computer-implemented method of claim 5, further comprising searching a memory using the pitch angle to determine a size of the portion of the transformed image.

12. The computer-implemented method of claim 5, further comprising:

receiving, from a mobile computing device, a command to capture the image;

capturing the image; and displaying, on the mobile computing device, the nonlinearly transformed image.

13. An image perspective transformation system, comprising:

an image capture device;

at least one processor; and a non-transitory computer-readable memory storing computer-executable instructions that when executed cause the at least one processor to perform a method comprising:

receiving a command to capture an image;

capturing the image with the image capture device;

determining an orientation of the image capture device;

generating a transformed image by performing a linear perspective transformation of the image;

determining at least one compression value for a portion of the transformed image, wherein the at least one compression value is based at least in part on the orientation; and generating a nonlinearly transformed image based at least in part on the portion and the at least one compression value.

14. The image perspective transformation system of claim 13, wherein the image capture device further includes a depth sensor effective to generate a depth map, wherein the computer-executable instructions when executed cause the processor to perform the method comprising determining the orientation based at least in part on the depth map.

15. The image perspective transformation system of claim 13, wherein the computer-executable instructions that when executed cause the at least one processor to perform the method comprising:

identifying a subject of the image;

identifying a feature of the subject; and determining a size of the portion based at least in part on a location of the feature of the subject.

16. The image perspective transformation system of claim 13, wherein the computer-executable instructions that when executed cause the at least one processor to perform the method comprising:

identifying a strength parameter associated with the orientation, wherein the strength parameter is effective to modulate the linear perspective transformation; and determining an effective orientation based at least in part on the strength parameter, wherein the perform the linear perspective transformation is based at least in part on the effective orientation.

17. The image perspective transformation system of claim 13, wherein the computer-executable instructions that when executed cause the at least one processor to perform the method comprising:

searching the non-transitory computer-readable memory using the orientation to determine a compression factor associated with the orientation, wherein the at least one compression value is based at least in part on the compression factor.

18. The image perspective transformation system of claim 17, wherein the computer-executable instructions that when executed cause the at least one processor to perform the method comprising searching the non-transitory computer-readable memory using the orientation to determine a size of the portion of the transformed image.

19. The image perspective transformation system of claim 13, wherein the computer-executable instructions that when executed cause the at least one processor to perform the method comprising:

determining a roll angle of the image capture device relative to an environment of the image capture device; and rotating the image by a number of degrees that is substantially equal to the roll angle.

20. The image perspective transformation system of claim 13, wherein the computer-executable instructions that when executed cause the at least one processor to perform the method comprising:

identifying an article of clothing worn by a subject of the image; and determining that the article of clothing is available for sale on a website.

* * * * *